(12) United States Patent
Onusko

(10) Patent No.: US 9,589,043 B2
(45) Date of Patent: Mar. 7, 2017

(54) UNIFIED CONTEXT-AWARE CONTENT ARCHIVE SYSTEM

(71) Applicant: Actiance, Inc., Redwood City, CA (US)

(72) Inventor: John Onusko, Garden Valley, CA (US)

(73) Assignee: Actiance, Inc., Redwood City, CA (US)

( * ) Notice: Subject to any disclaimer, the term of this patent is extended or adjusted under 35 U.S.C. 154(b) by 614 days.

(21) Appl. No.: 13/957,154

(22) Filed: Aug. 1, 2013

(65) Prior Publication Data

US 2015/0039565 A1 Feb. 5, 2015

(51) Int. Cl.
*G06F 17/30* (2006.01)
*H04L 29/06* (2006.01)
*G06Q 10/10* (2012.01)

(52) U.S. Cl.
CPC ....... *G06F 17/30595* (2013.01); *G06Q 10/10* (2013.01); *H04L 63/10* (2013.01)

(58) Field of Classification Search
CPC .......... G06F 17/30595; G06F 11/1464; G06F 17/30505; G06F 17/30; G06F 11/14; G06F 11/014; G06F 17/30011; G06F 17/30867; G06F 17/30321; G06F 17/30554; G06F 3/0484; H04L 63/10; G06Q 10/10; G06Q 30/016; G06Q 30/0201; H04W 4/12
See application file for complete search history.

(56) References Cited

U.S. PATENT DOCUMENTS

| | | | |
|---|---|---|---|
| 7,143,091 B2* | 11/2006 | Charnock | G06F 17/30716 707/E17.095 |
| 2003/0220917 A1* | 11/2003 | Copperman | G06F 17/3064 707/E17.066 |
| 2003/0229900 A1 | 12/2003 | Reisman | |

(Continued)

OTHER PUBLICATIONS

Dalila Mekhaldi—"Multimodal Document Alignment: towards a Fully-indexed Multimedia Archive"—SIGIR'07, Jul. 23-27, 2007, Amsterdam, the Netherlands.—Copyright 2007 ACM—multimedia informtation retrieval workshop, SIGIR, 2007—rgcl.wlv.ac.uk—pp. 1-7.*

(Continued)

*Primary Examiner* — Anh Ly
(74) *Attorney, Agent, or Firm* — Kilpatrick Townsend & Stockton LLP

(57) ABSTRACT

A unified context-aware content archive system allows enterprises to manage, enforce, monitor, moderate, and review business records associated with a variety of communication modalities. The system may store an information infoset derived or inferred from one or more documents representing communications according to the variety of communication modalities as interaction transcripts. An interaction transcript represents interactions between participants through the documents rather than the documents themselves allowing for derivation or inference of communication events, chronologies, and mappings to be stored in a common data structure. In one aspect, events correlation is provided between participants of communications that can (Continued)

be established by general time series analysis for the purposes of extracting meaningful statistics and interaction contexts and other characteristics of data. In another aspect, chronological mappings are provided of conversations between an established start and end time frame.

29 Claims, 16 Drawing Sheets

(56) References Cited

U.S. PATENT DOCUMENTS

| | | | |
|---|---|---|---|
| 2004/0025110 A1* | 2/2004 | Hu | G06F 19/321 715/234 |
| 2004/0034834 A1* | 2/2004 | Pirie | G06F 17/2725 715/255 |
| 2005/0216503 A1* | 9/2005 | Charlot | G06Q 50/22 707/E17.005 |
| 2005/0278340 A1* | 12/2005 | Rehberg | G06Q 10/00 707/E17.014 |
| 2006/0143034 A1 | 6/2006 | Rothermel et al. | |
| 2008/0010629 A1* | 1/2008 | Berg | G06F 8/36 717/116 |
| 2008/0065471 A1* | 3/2008 | Reynolds | G06Q 10/06 705/7.32 |
| 2008/0118051 A1* | 5/2008 | Odinak | H04W 4/12 379/265.09 |
| 2008/0195576 A1* | 8/2008 | Sande | G06F 17/30566 707/E17.032 |
| 2009/0254572 A1* | 10/2009 | Redlich | G06Q 10/06 707/E17.032 |
| 2010/0138756 A1 | 6/2010 | Saund et al. | |
| 2010/0250497 A1* | 9/2010 | Redlich | F41H 13/00 707/661 |
| 2010/0257140 A1* | 10/2010 | Davis | G06F 17/30073 707/661 |
| 2011/0122866 A1* | 5/2011 | Vasamsetti | H04L 41/12 370/352 |
| 2011/0202947 A1* | 8/2011 | Gupta | H04N 21/26266 725/14 |
| 2011/0302025 A1* | 12/2011 | Hsiao | G06Q 30/02 705/14.42 |
| 2012/0197871 A1* | 8/2012 | Mandel | G06F 17/30994 707/722 |
| 2012/0200567 A1* | 8/2012 | Mandel | G06F 17/30994 345/420 |
| 2012/0330869 A1* | 12/2012 | Durham | G06N 5/022 706/16 |
| 2013/0024492 A1 | 1/2013 | Graff et al. | |
| 2013/0203038 A1 | 8/2013 | Kumar et al. | |
| 2014/0100128 A1 | 4/2014 | Narain et al. | |
| 2014/0143018 A1* | 5/2014 | Nies | G06Q 30/0201 705/7.32 |
| 2014/0343973 A1* | 11/2014 | Ruszala | G06Q 30/04 705/4 |
| 2015/0033139 A1* | 1/2015 | Thiel | G06F 3/0484 715/740 |
| 2015/0074579 A1* | 3/2015 | Gladstone | G06F 3/0484 715/771 |
| 2015/0205770 A1 | 7/2015 | Shershevsky et al. | |
| 2015/0339370 A1* | 11/2015 | Onusko | G06F 17/30595 707/722 |

OTHER PUBLICATIONS

Michael Kipp et al.—"Fusion and Coordination for Multimodal Interactive Information Presentation—Roadmap, Architecture, Tools, Semantics"—Intelligent Information Presentation, 2003 Kluwer Academic Publishers. Printed in the Netherlands—Multimodal Intelligent Information Presentation, vol. 27, 2005—Springer—academia.edu—pp. 1-17.*

* cited by examiner

| Field | Description | Metadata | Note |
|---|---|---|---|
| To: | Specifies the list of participants | | indexable |
| From: | The originator | | indexable |
| Subject: | Context of the communication | | indexable |
| Body: | Text content of the communication | | indexable |
| Attachments | File events | | Indexable ( undergoes text extraction process ) |
| Msg-id | Unique message identifier | Yes | |
| Start-time | Timestamp when email was sent | Yes | Signifies the creation of the event |
| End-time | =start-time | Yes | Marks an open-closed event |

FIG. 7A

| Field | Description | Metadata | Note |
|---|---|---|---|
| Owner: | The originator | | indexable |
| Subject: | Topic of the communication | | indexable |
| Message: | Text content of the communication | | indexable |
| Attachments | File events | | Indexable ( undergoes text extraction process ) |
| Msg-id | Unique message identifier | Yes | |
| Start-time | Timestamp when email was sent | Yes | Signifies the creation of the event |
| End-time | [open] | Yes | Marks an open-ended event |
| Parent-communication-id | Parent id of the communication event | Yes | |
| Communication-oid | Communication object id | Yes | |
| Participant list | | Yes | |
| File events | Attachment events | Yes | |
| Text events | Main context of communication | Yes | |

FIG. 7B

| Field | Description | Metadata | Note |
|---|---|---|---|
| Owner: | The originator | | indexable |
| Subject: | Topic of the communication | | indexable |
| Event id: | Text content of the communication | | |
| Attachments | File events | | Indexable ( undergoes text extraction process ) |
| event-id | Unique message identifier | Yes | |
| Start-time | Timestamp when email was sent | Yes | Signifies the creation of the event |
| End-time | [open] | Yes | Marks an open-ended event |
| Parent-communication-id | Parent id of the communication event | Yes | |
| Communication-oid | Communication object id. | Yes | |
| Participant events | | Yes | |
| File events | Attachment events | Yes | |
| Text events | Main context of communication | Yes | |

FIG. 7C

| Field | Description | Metadata | Note |
|---|---|---|---|
| Owner: | The originator | | indexable |
| Subject: | Topic of the communication | | indexable |
| Event Text: | Text content of the communication | | indexable |
| socnet | Unique message identifier | Yes | |
| Start-time | Timestamp when email was sent | Yes | Signifies the creation of the event |
| End-time | [open] | Yes | Marks an open-ended event |
| Parent-communication-id | Parent id of the communication event | Yes | |
| Communication-oid | Communication object id. | Yes | |
| Participant events | | Yes | |
| File events | Attachment events | Yes | |
| Text events | Main context of communication | Yes | |
| Action | Post, update, created, update, delete | Yes | |

FIG. 7D

| Field | Description | Metadata | Note |
|---|---|---|---|
| Owner: | The originator | | indexable |
| Name: | Topic of the communication | | indexable |
| Content: | Text content | | indexable |
| Start-time | Timestamp when email was sent | Yes | Signifies the creation of the event |
| End-time | [open] | Yes | Marks an open-ended event |
| Parent-communication-id | Parent id of the communication event | Yes | |
| Communication-oid | Communication object id | Yes | |
| Participant events | | Yes | |
| File events | Attachment events | Yes | |
| Text events | Main context of communication | Yes | |
| Action | Post, update, created, update, delete | Yes | |

FIG. 7E

UNIFIED CONTEXT-AWARE CONTENT ARCHIVE SYSTEM

BACKGROUND OF THE INVENTION

Embodiments of the present invention generally relate to techniques for processing and archiving electronically stored information (ESI). More particularly, the present inventions relates to a unified context-aware content archive system and related techniques.

Collaboration using a variety of communication mediums, such as e-mail and instant messaging, voice over Internet Protocol (VoIP), and social networks is becoming increasingly ubiquitous. Many users and organizations have transitioned to paperless or all-digital offices, where information and documents are communicated and stored almost exclusively digitally. As a result, users and organizations are also now expended time and money to store and archive increasing volumes digital documents and data.

At the same time, state and federal regulators, such as the Securities and Exchange Commission (SEC), have become increasingly aggressive in enforcing regulations relate to electronically stored information. Additionally, criminal cases and civil litigation frequently employ use of electronic discovery (eDiscovery) tools, in addition to traditional discovery methods.

Clearly, one problem with the increasing volumes digital documents and data the accumulate is how the data is later accessed and retrieved. As broadband connections to the Internet are common in most homes and business, emails frequently include one or more multi-Megabyte attachments, instant messaging sessions are used to transfer files and pictures, use of social networking applications have exploded, voice/video conferences are routinely held. As users grow accustomed to communicating using a variety of communication mediums, the electrically stored data associated with each different communication medium becomes increasingly of diverse and, if propriety formats are used, later access to the data becomes difficult without the required software. Another problem is that organization-based or regulatory-based disclosure and/or reporting requirements do not simply require that the information be preserved and then disclosed. Often, the disclosure and/or reporting requirements are more directed toward the context of the communication, such as the level of access one or more participants had to sensitive data referred to in the contents of a given electronic communication.

For these reasons, the inventors believe that users and organizations need a unified context-aware content archive to help lower costs managing and disclosing electronically stored information. Accordingly, what is desired is to solve problems relating to storing electronic communications using multiple different communication modalities, some of which may be discussed herein. Additionally, what is desired is to reduce drawbacks relating to searching for contexts between stored electronic communications, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a unified context-aware content archive system provides an information storage and retrieval system that allows enterprises to manage, enforce, monitor, moderate, and review business records associated with a variety of communication modalities. A unified context-aware content archive system according to some embodiments may store an information infoset derived or inferred from one or more documents representing communications according to the variety of communication modalities as interaction transcripts. An interaction transcript represents interactions between participants through the documents rather than the documents themselves allowing for derivation or inference of communication events, chronologies, and mappings to be stored in a common data structure. In one aspect, events correlation is provided between participants of communications that can be established by general time series analysis for the purposes of extracting meaningful statistics and interaction contexts and other characteristics of data. In another aspect, chronological mappings are provided of conversations between an established start and end time frame. In yet another embodiment, sequential mappings are provided of interactions, conversations, threads, posts made without timestamps. In some aspects, correlations are provided using multivariate modalities that allow for expressiveness of chronological mappings of inter and intra events.

In various embodiments for archiving communications, information associated with one or more documents captured for at least one of a plurality of communication modalities is received. Information is determined indicative of an interaction between one or more participants of at least one or more communications represented by the one or more documents. A transcript of the interaction is generated that includes a bounded definition defining a sequence of one or more events that occur during the interaction. The transcript of the interaction is then stored according to a model that normalizes information associated with the plurality of communication modalities into a common information structure.

The plurality of communication modalities may include email communications, unified communications, collaboration communications, and social network communications. Determining the information indicative of the interaction between the one or more participants of the at least one or more communications represented by the one or more documents may include determining a combination of event-base timing signatures, participants engaging in an interaction, a unique correlation of persons, correlation through time, correlation through participant associations, and relationships through identity management. Storing the transcript of the interaction according to the model that normalizes information associated with the plurality of communication modalities into the common information structure may include determining a mapping between data attributes of at least one document and data attributes of the common information structure.

Storing the transcript of the interaction according to the model that normalizes information associated with the plurality of communication modalities into the common information structure may include inferring information about at least one document for attributes of the common information structure from another source. Storing the transcript of the interaction according to the model that normalizes information associated with the plurality of communication modalities into the common information structure may also include derive information about at least one document for attributes of the common information structure from another source. In one aspect, storing the transcript of the interaction according to the model that normalizes information associated with the plurality of communication modalities into the common information structure may include partitioning data across a specialized medium store. In another aspect, storing the transcript of the interaction according to the model that normalizes information associated with the plurality of communication modalities into the common information structure may include tagging the interaction based on a set of predetermined tags. In some embodiments, storing the transcript of the interaction according to the model that normalizes information associated with the plurality of communication modalities into the common information structure may include scrubbing data, determining identity information, and de-encapsulating the data.

In at least one aspect, generating the transcript of the interaction may include determining one or more contexts across each of the plurality of communication modalities. Generating the transcript of the interaction may include determining relationships between the one or more participants. Generating the transcript of the interaction may include deriving or inferring a context via sequenced ordering of events corresponding to each distinct event.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIGS. 7A-7E are tables illustrating mappings between different communication modalities and a single information structure according to various embodiments of the present invention.

DETAILED DESCRIPTION OF THE INVENTION

Figure 1:
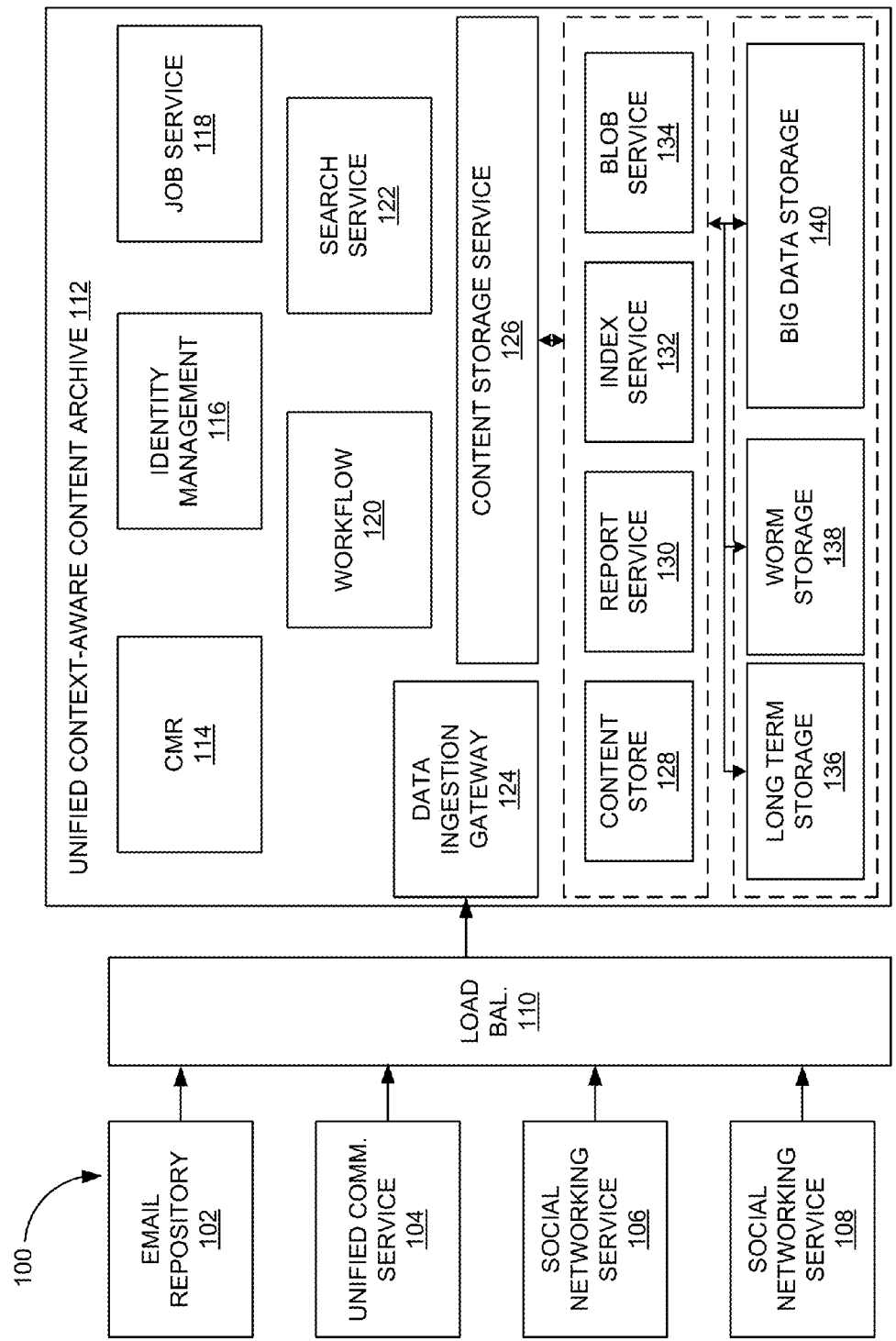
FIG. 1 is a block diagram of an electronically stored information system according to one embodiment of the present invention.

In various embodiments, a unified context-aware content archive system provides an information storage and retrieval system that allows enterprises to manage, enforce, monitor, moderate, and review business records associated with a variety of communication modalities. A unified context-aware content archive system according to some embodiments may store an information infoset derived or inferred from one or more documents representing communications according to the variety of communication modalities as interaction transcripts. An interaction transcript represents interactions between participants through the documents rather than the documents themselves allowing for derivation or inference of communication events, chronologies, and mappings to be stored in a common data structure. In one aspect, events correlation is provided between participants of communications that can be established by general time series analysis for the purposes of extracting meaningful statistics and interaction contexts and other characteristics of data. In another aspect, chronological mappings are provided of conversations between an established start and end time frame. In yet another embodiment, sequential mappings are provided of interactions, conversations, threads, posts made without timestamps. In some aspects, correlations are provided using multivariate modalities that allow for expressiveness of chronological mappings of inter and intra events.

Furthermore, the unified context-aware content archive system allows general purpose applications to search for and extract contexts associated with interactions between participants. In one aspect, contexts can be derived from using multi-lateral attributes from heterogeneous data repositories that are unknown to the application. This allows, for example, for systematic pluggabilty of searchable business records for the purposes of EDRM applications. In another aspect, the unified context-aware content archive system may associate search attributes of a subject represented by a user input term with one or more attributes of interactions stored in a database. Based on this association, data whose attributes is associated with the search attribute is collected and provided to the user as feedback.

Terminology

To assist in the understanding of this disclosure, the following provides general definitions of a number of terms and phrases used herein with a view toward aiding in the comprehension of such terms and phrases. As space limitations preclude full delineation of all meanings, the general definitions that follow should be regarded as providing one or more intended meanings of the terms and phrases. Unless otherwise specified, the general definition should not be viewed as being an exhaustive list or otherwise excluding the ordinary plain and plain meanings of the terms or phrases.

Interaction—An interaction generally refers to an unbounded or bounded sequence or series of communication events according to one or more of a plurality of communication modalities. An interaction may include one or more participants participating during each communication event.

Communication Modality—A communication modality generally refers to a communication classification reflecting base characteristics of one or more channels and/or networks as a means to collaborate between one or more participants over one or more chosen communication mediums. Some examples of communication modalities for purposes of this disclosure include electronic mail (email), instant messaging/chat, web collaboration, video conferencing, voice telephony, social networks, and the like. For purposes of this disclosure, four super classes of communication modalities are explained to generalize most communication forms. These super classes include: Email, Unified Communications, Collaboration, and Social Networks.

Email—An email communication modality generally refers to a class of communication media or a medium that models non-realtime electronic communication. One example of a non-realtime electronic communication is electronic mail (email or e-mail). Email is typically a ubiquitous form of communication between one or more participants (e.g., a sender and one or more recipients). As used herein, an electronic communication may include one or more documents (e.g., emails represented in one or more of a plurality of forms) that serve as a basis for one or more business records.

Unified Communication—A unified communication modality generally refers to a class of communication media or a medium that models real-time or substantially real-time communication. Some examples of unified communications includes instant messaging, voice (analog and digital), VoIP, etc. Unified communication is also typically a ubiquitous form of communication between one or more participants and, as used herein, may include one or more documents (e.g., IM/Chat sessions, voicemail, etc. represented in one or more of a plurality of forms) that serve as a basis for one or more business records.

Collaboration—A collaboration communication modality generally refers to multiple classes of communication media that encapsulate a plurality of communication modalities. A collaboration is typically represented as a unique or unified thread of communication. A collaboration can therefore be referred to as a multi-variant modality. In one example of a communication, Alice starts a WebEx session related to corporate information with Bob. Bob engages in an instant messaging (IM) session with Charlie who is a subject matter expert on the corporate information and who also is not an employee of the company that employs Alice and Bob. Bob then sends an email to one or more participants external to the company to further discuss the corporate information and the IM session with Charlie. This collaboration example contains at least three communication modalities starting with the WebEx session, the IM session, and Bob's email. A collaboration communication modality may be represented in one or more of a plurality of forms that serve as a basis for one or more business records.

Social Network—A social network communication modality generally refers to one or more interactions among specialized social networks or communities. In general, modern day social networking software platforms are designed to engage, promote or foster social interactions among communities such as family members, peers, specialized social networks/communities, and enterprise collaborators. Examples of social networks include Facebook, Twitter, Linked-In, etc. A social network communication modality may be represented in one or more of a plurality of forms that serve as a basis for one or more business records.

A content-agnostic storage system as used herein generally represents hardware and/or software elements configured for storing entities representing a definition of an interaction between one or more participants according to a variety of communication modalities. The system may perform the managing, integrating, and searching of data associated with the storage and retrieval of models of various interactions. Some examples of storage resources include data storage independent solutions using RDBMS, XML Repositories, File Systems, and Key-Value storage; aka Big Data storage.

A context-aware search engine as used herein generally represents hardware and/or software elements configured for indexing and searching data associated with the storage and retrieval of models of various interactions. Some examples include Web Scale Full-Text Search distributed server farms and Tuple-based Search using Relations. This may include a convergence of RDBMS and Big Data Search for context-aware indexing and searches.

A data capture system as used herein generally represents hardware and/or software elements configured for capturing content associated with one or more communication modalities. Content may be captured as wired (transport datagram) and application data. In various embodiments, content may be captured as documents formatted according to known protocols or standards for messages of particular communication modalities. Content may be processed to derive interaction transcripts for storage into a content-agnostic storage system for the purposes of compliance enforcement, moderation, and review as discussed further herein.

A data capture system may capture content using a varity of mechanisms. In one example, data at rest as used herein generally refers to one or more means for processing and/or enriching data that is classified as being resident in a storage or repository system. Typically, the data is to be read into a volatile state (memory), processed (enriched, mutated, analyzed, etc), and then placed back into storage, such as persistent storage. Data in motion as used herein generally refers to one or more means for capturing, extracting, enriching, tracking, or otherwise processing data classified as participating in real-time events. Typically, the data is transient and thus held in volatile state even if it is traversing a wire or wireless transport.

Big Data as used herein generally refers to any technology that makes use of key-value storage. Big Data typically includes computation as a basis of a distributed file system or a collection of server farms using commodity hardware and storage. Big Data can be used strictly for: Scaling Storage (infinite storage), Scaling Computing/Processing Power, or Both. Big Data can also be used for: Public Cloud, Private Cloud, Private Data Center, On-Premise, or Hybrid Cloud/Data Center.

Multi-Variant Index—A multi-varient index as used herein generally refers to the application of cross-indexes used as an aggregated form to derive a single and normalized searchable content from the view point of the application. This requires use of multi-variables (dimensions) to generate the composite index which may be virtualized across segments (shards) on distributed nodes or server farms. A single index usually comes in the form of a reverse index which is a means to compute document addresses (locations) in a single file. This allows for O[c] constant lookup of documents.

Electronically Stored Information System

FIG. 1 is a block diagram of electronically stored information (ESI) system 100 according to one embodiment of the present invention. ESI system 100 may incorporate various embodiments or implementations of the one or more inventions presented within this disclosure. In this example, ESI system 100 includes email repository 102, unified communications service 104, social networking service 108, load balancer 110, and unified context-aware content archive 112. FIG. 1 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Email repository 102 is representative of one or more hardware and/or software elements from which electronically stored information related to an email communication modality may be obtained. Email repository 102 may provide access to one or more email modality documents and associated metadata. Email repository 102 may act as an email storage service, an email service, an email gateway, or the like. One example of the email repository 102 is a computer system running Microsoft Exchange Server from Microsoft Corporation of Redmond, Wash. In other examples, email repository 102 may include operating systems, such as Microsoft Windows™, UNIX™, and Linux™, and one or more mail transport agents, mail user agents, and the like. Email communications may be stored on email repository 102 or accessibly therefrom in a file, such as an Outlook PST file or mbox file, in a database, or the like.

Unified communications service 104 is representative of one or more hardware and/or software elements from which electronically stored information related to a unified communication modality may be obtained. Unified communications service 104 may provide access to one or more unified communication modality documents and associated metadata. Unified communications service 104 may provide access to real-time communication services such as instant messaging (chat), presence information, telephony (including IP telephony), video conferencing, data sharing (including web connected electronic whiteboards aka IWB's or Interactive White Boards), call control and speech recognition. Unified communications may be stored on unified communications service 104 or accessibly therefrom in a file, in a database, or the like.

Collaboration service 106 is representative of one or more hardware and/or software elements from which electronically stored information related to a collaboration communication modality may be obtained. Collaboration service 106 may provide access to one or more collaboration modality documents and associated metadata. Collaboration service 106 communications may be stored on collaboration service 106 or accessibly therefrom in a file, in a database, or the like.

Social networking service 108 is representative of one or more hardware and/or software elements from which electronically stored information related to a social network communication modality may be obtained. Social networking service 108 may provide access to one or more social network communication modality documents and associated metadata. A social network is a social structure made up of a set of social actors (such as individuals or organizations) and a complex set of the dyadic ties between these actors. Social networking service 108 may provide information about the social structure, the social actors, and the ties between the actors. Social networking service 108 may further provide information related to electronic communications made via one or more applications that host the social network.

In various embodiments, social networking service 108 provides monitoring in real-time and aggregating "social media" into a communication form that can be managed holistically using compliance protocols for the regulated industries. Accordingly, social media interactions may be collected for general storage and later search-ability. In one aspect, a social media interaction may include time points of communication events (e.g., an event transcript). Events may be determined corresponding to create, posts, updates, edit, modifications, deletion etc. on artifacts associated with ESI systems. In another aspect, events may correspond to a blog, a chat, a video session, an audio recording, an instance message, a tweet, a newly constructed web page on a Portola site, a phone call, a television feed. These can be classified in real-time as predetermined events such as tweets, news alerts, Facebook posts, linked-in events, etc.

In further embodiments, social networking service 108 provides a connection context. For example, social networking service 108 may determine participants involved in the communication that can be mapped to a logical social graph. Social networking service 108 may derive in-band and out-of-band context. In-band for purposes of this disclosure mean contexts within a social media platform, such as Salesforce, LinkedIn, Facebook, Tweeter, MSN, Google+, etc. Social networking service 108 may use a native API to obtain metadata within a social network API. Out-of-band for purposes of this disclosure implies unrelated or disparate interconnects of social media networks (LinkedIn, Facebook, Twitter, etc.). To employ out-of-band information, social networking service 108 may employ normalization of metadata enrichment and aggregation of an information domain. Accordingly, a fuller context is provided of a participant's inter-connections and intra-connections to other participants across any social network domain. In other words, intra is more about in-band single social network domain and inter is about using plurality of 2 or more social network domains (e.g., the application of across and heterogeneous networks and/or social media platforms, such as Facebook, Tweeter, LinkedIn, Microsoft, Google, Apple, Bloomberg, etc.).

Figure 13:
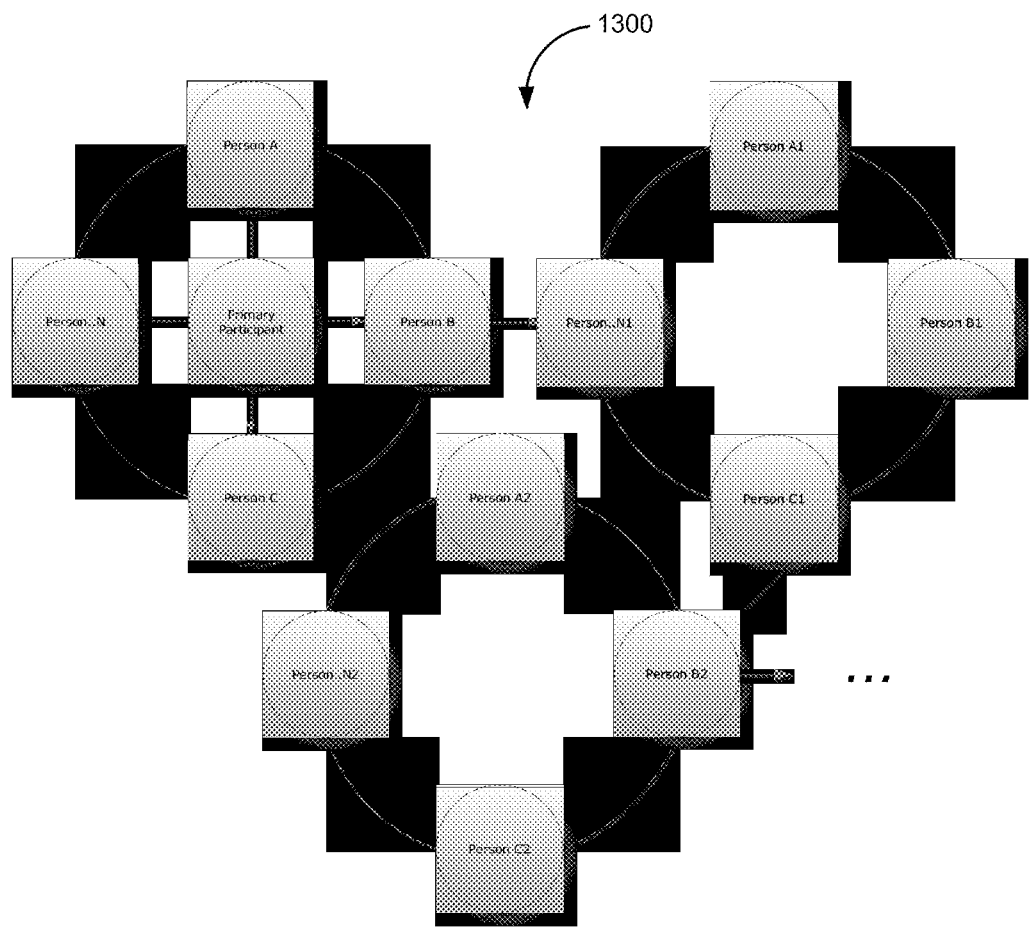
FIGS. 13-14 are illustrations of social media graphs in various embodiments according to the present invention.
Figure 14:
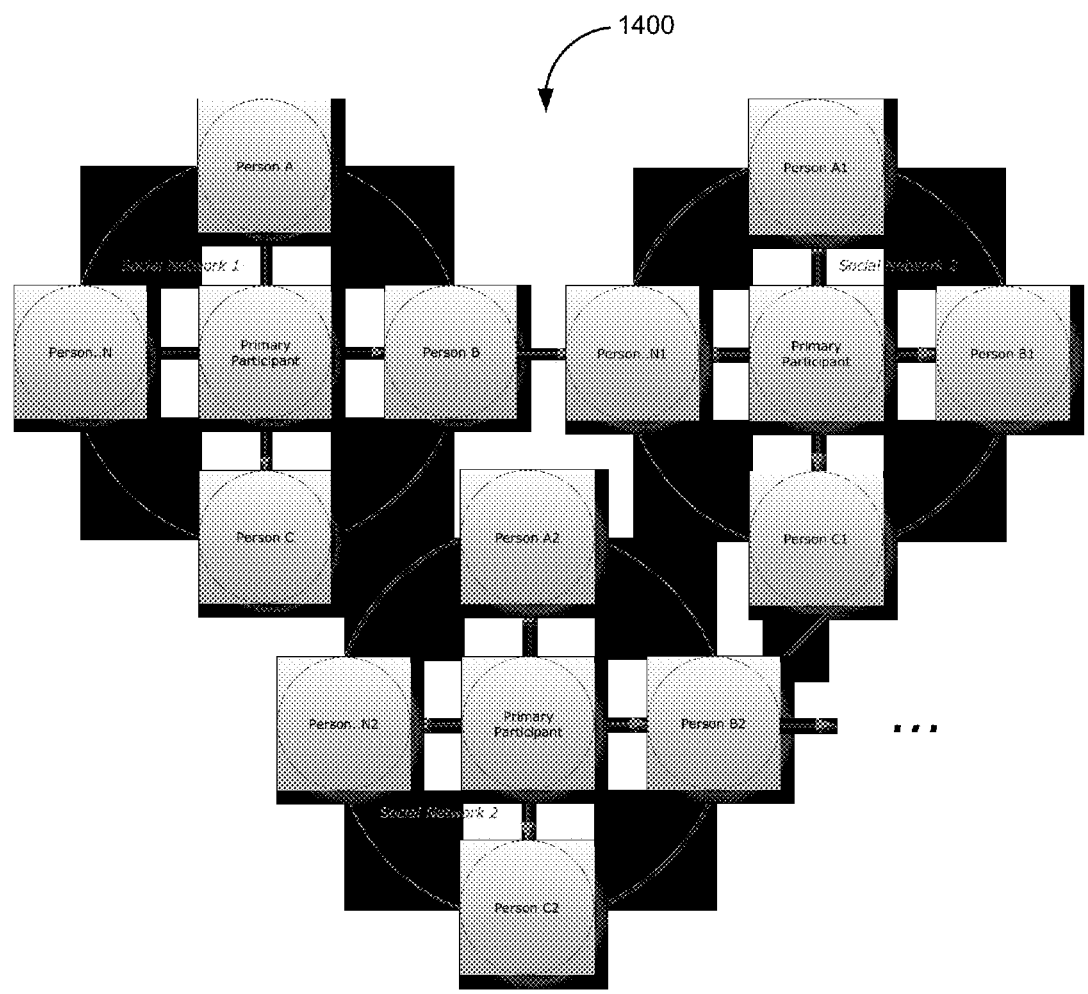

FIGS. 13-14 are illustrations of social media graphs 1300 and 1400 in various embodiments according to the present invention. In one aspect, ESI system 100 utilizes an in-band approach to derive social media-ware connections (intra-connections). For example, ESI system 100 (or social networking service 108) may use native API from supporting social media platforms and enrich data captured from the API with metadata at the capture point. Interaction may be synthesized into a normalized information set that may be stored locally for passive processing, for example, events (such as real-time and non-real-time) may be synthesized in a de-normalized information set that may be stored transiently for a short period of time and pushed for normalized staging and downstream processing. In one aspect, a social graph may be derived by using native API if a social platform (network) supports it. If none is present, social networking service 108 may enrich the context at the capture point with such information.

A social graph may be n-deep at the end of a termination chain (e.g., the last participant in a communication chain). Conversation can be bounded by system/application context. For example, an email participants' direct communication may be determined by the members on the "To:" list of an originating email. Each hop via traversing the participant's "To:" designator determines a "hop" or closed loop or ring of a graph. The scale of participants may be determined by the closed loop/ring or hops (i.e., the depth of the graph).

In various embodiments, out-of-band social connections may be derived by processing information based on subnets. This implication is that information is synthesize at the source of the capture point in the case where the information is already normalized by the capture point, for example, during passive processing. Data is at rest and waiting to be collected by upstream applications. Secondly, the total sum of information regarding inter-connection may be obtained by merging the aggregated sets into one normalized form. This may be done at two possible points of interests: a) the capture point (the point product or 3rd party application/connector) and within ESI system 100 at a normalization stage. ESI system 100 therefore captures "connections" within activities or interactions across different domains using real-time event streaming protocols or generalized capture points for data collection processing purposes.

Referring again to FIG. 1, load balancer 110 is representative of one or more hardware and/or software elements that distribute the workload of obtaining the different communication modalities from email repository 102, unified communications service 104, collaboration service 104, and social networking service 108 across multiple computers or a computer cluster, network links, central processing units, disk drives, or other resources, to achieve optimal resource utilization, maximize throughput, minimize response time, and avoid overload.

Unified context-aware content archive 112 includes hardware and/or software elements configured to obtain electronically stored information related to multiple communication modalities and store interaction transcripts determined therefrom in a single information structure. In one example of operation, unified context-aware content archive 112 obtains electronic communications from email repository 106, unified communications service 108, collaboration service 108, and social networking service 110 via load balancer 110. Unified context-aware content archive 112 may obtain electronic communications using a variety of known techniques, such as push or pull mechanisms. In one embodiment, unified context-aware content archive 112 may obtain electronic communications directly or indirectly through a service that monitors electronic communications in real-time or in-non real-time.

In various embodiments, unified context-aware content archive 112 is configured to receive electronic communications according to the above various communication modalities and processes documents representing the electronic communications to determine interactions between one or more participants. A series of events that form the interactions may be modeled as a single information structure facilitating storage and retrieval. Unified context-aware content archive 112 can store content in a searchable form via normalization into the single information structure that is retrievable based on contexts derived or inferred from the single information structure. Unified context-aware content archive 112 may incorporate a variety of traditional storage mechanisms (e.g., relational databases) and non-traditional storage mechanisms (e.g., Big Data).

In this example, unified context-aware content archive 112 includes content management repository (CMR) module 114, identity management module 116, job service module 118, workflow module 120, search service module 122, data ingestion gateway module 124, content storage service module 126, content store module 128, report service module 130, index service module 132, blob service 134, long term storage module 136, WORM storage module 138, and big data storage module 140.

Content management repository (CMR) module 114 represents hardware and/or software elements configured for managing an organization's content. CMR module 114 may incorporate technology to store and index, classify, search and retrieve objects of all types. CMR module 114 may be used by unified context-aware content archive 112 in the processing of or enrichment of electronic communications, management of data, and the like.

Identity management module 116 represents hardware and/or software elements configured for managing individual identifiers, their authentication, authorization, and privileges within or across system and organization boundaries. Identity management module 116 may be used by unified context-aware content archive 112 in the processing of or enrichment of electronic communications.

Job service module 118 represents hardware and/or software elements configured for managing one or more jobs or tasks. Job service module 118 may be used by unified context-aware content archive 112 in the processing of or enrichment of electronic communications. Workflow module 120 represents hardware and/or software elements configured for managing or orchestrating one or more workflows. Workflow module 120 may be used by unified context-aware content archive 112 in the processing of or enrichment of electronic communications. A workflow may include one or more jobs or tasks. In one example, a workflow includes a communication capture step, an enrichment step that determines information related to the communication, a processing step that transforms or processing information related to the communication, a normalization step that generates a normalized version of the communication, and a storage step that stores the communication in one or more forms.

Search service module 122 represents hardware and/or software elements configured for managing searches related to communications. Search service module 122 may be used by unified context-aware content archive 112 in the indexing and retrieval of electronic communications.

Data ingestion gateway module 124 represents hardware and/or software elements configured for managing the intact of electronic communications from email repository 106, unified communications service 108, and social networking service 110. Data ingestion gateway module 124 may provide security features, access control lists, and the like for maintaining the integrity of and records for stored communications.

Content storage service module 126 represents hardware and/or software elements configured for managing the storage and retrieval of normalized electronic communications. Content storage service module 126 provides a content-agnostic storage system for storing, managing, searching, integration data storage independent solutions using RDBMS, XML Repositories, File Systems, and Key-Value storage; aka Big Data storage.

Content store module 128 represents hardware and/or software elements configured for managing the storage and retrieval of primarily textual information related to electronic communications. Report service module 130 represents hardware and/or software elements configured for managing the generation of reports related to captured, indexed and stored communications. Index service module 132 represents hardware and/or software elements configured for managing the indexing of stored communications. Some examples of indexes may be full-text indices, semantic analysis, topic indices, metadata indices, and the like. Blob service 134 represents hardware and/or software elements configured for managing the storage and retrieval of primarily binary data, such as attachments to emails and instant messages, voicemails, blogs, network posts, and the like.

Long term storage module 136 represents hardware and/or software elements configured for managing the long term storage and retrieval of electronic communications. WORM storage module 138 represents hardware and/or software elements configured for managing data in long-term storage. For example, WORM storage module 138 may be a data storage device in which information, once written, cannot be modified. This write protection affords the assurance that the data cannot be tampered with once it is written to the device. Big data storage module 140 represents hardware and/or software elements configured for managing data sets with sizes beyond the ability of commonly used software tools to capture, curate, manage, and process the data within a tolerable elapsed time.

In general, unified context-aware content archive 112 provides for the capturing of multiple forms of communication. Specifically, unified context-aware content archive 112 provides for domain specific classification of information established around email, unified communication, collaboration, and social networks. In one aspect, unified context-aware content archive 112 classifies electronic communication mediums into the four distinct aforementioned categories such that they share common characteristics. Some examples of common characteristics are event-base timing signatures (e.g., an event is sourced, injected or derived by corresponding point in time; i.e., time of incident), participants engaging in one or more connected interactions or conversations (e.g., unique correlations of persons can be made via CMR module 114 or identity management module 116 allowing identity mappings to be sourced, derived, or inferred—additionally, mappings may also be derived from social graphs by crawling social networks or connections), linked correlations through time series analysis, linked correlations through participant associations, aggregation/clustering or localization across group membership, and the like.

Unified context-aware content archive 112 further stores the common characteristics of the communication modalities via a normalization process into a single information structure. In various embodiments, unified context-aware content archive 112 generates an interaction transcript model ("ITM") based on one or more electronic communications. The model is an entity that represents one or more interactions between one or more participants according to one or more communication modalities. As discussed above, unified context-aware content archive 112 is not merely archiving documents associated with electronic communications. Unified context-aware content archive 112 determines an interaction as a bounded definition of a series or sequence of events derived or inferred from a set of documents.

In one aspect, ITM provides a single point of normalization into unified context-aware content archive 112 for search-ability and expressiveness. The ITM can be tailored for eDiscovery pipelines and other applications. In one aspect, unified context-aware content archive 112 implements an extract-transform-load (ETL) process for electronic communications for data enrichment, deconstruction, information partition. Enrichment enables unified context-aware content archive 112 to reclassify information, inject and enrich metadata, and partition data across specialized medium store. Unified context-aware content archive 112 further allows for streamed and serialized content into underlying repository suitable for downstream indexable content and analytics.

In various embodiments, unified context-aware content archive 112 provides searchable content based on contexts derived or inferred via "Attribute Normalization" across disparate storage system. Unified context-aware content archive 112 implements or otherwise creates and index that allows for conversations correlation between participants and derivations of relationships (participant to messages, participants to participants, message to participants). In one aspect, unified context-aware content archive 112 provides for searchable content based on time frames, derivation or inferred contexts via sequenced ordering of events corresponding to each distinct event, derivation or inferred contexts via chronologic events corresponding to each distinct event, and derivation or inferred contexts via linked to participants in question, derivation or inferred contexts via term association or referenced in messages or binary artifacts such as attachments, archive resources (tar, gzip, b2, etc), derivation or inferred contexts via shallow and deep analytics requiring data and process mining techniques, and the like.

In various embodiments, unified context-aware content archive 112 determines one or more interaction contexts. Unified context-aware content archive 112 can capture, model, derive, synthesize, and visualize interactions through use of heuristics and algorithms using time-series and semantic analysis to capture, archive, and search for business records based on contexts of time-stamp, and person-based identity mapping. An interaction context helps derive or infer additional information, such as event signified by key attributes such as timestamp, a global unique identification, a sequence number, a modality of event signifying whether it is open or closed, information derived or inferred by a person's identity, derived or inferred social graphs based on communication connections between participants (i.e., linked interactions), and the like. An interaction context can further help derive or infer information such as expressiveness of an event correlating to the interaction by means of metadata injection for data in motion, data at rest, and metadata tagging, meta-meta models, metadata for identity mapping, metadata for messages, and data enrichment via flow injection techniques. Injection can happen at live traffic capture, proxy capture using non-governed devices, network events, transport flows, and application flows.

Figure 2:
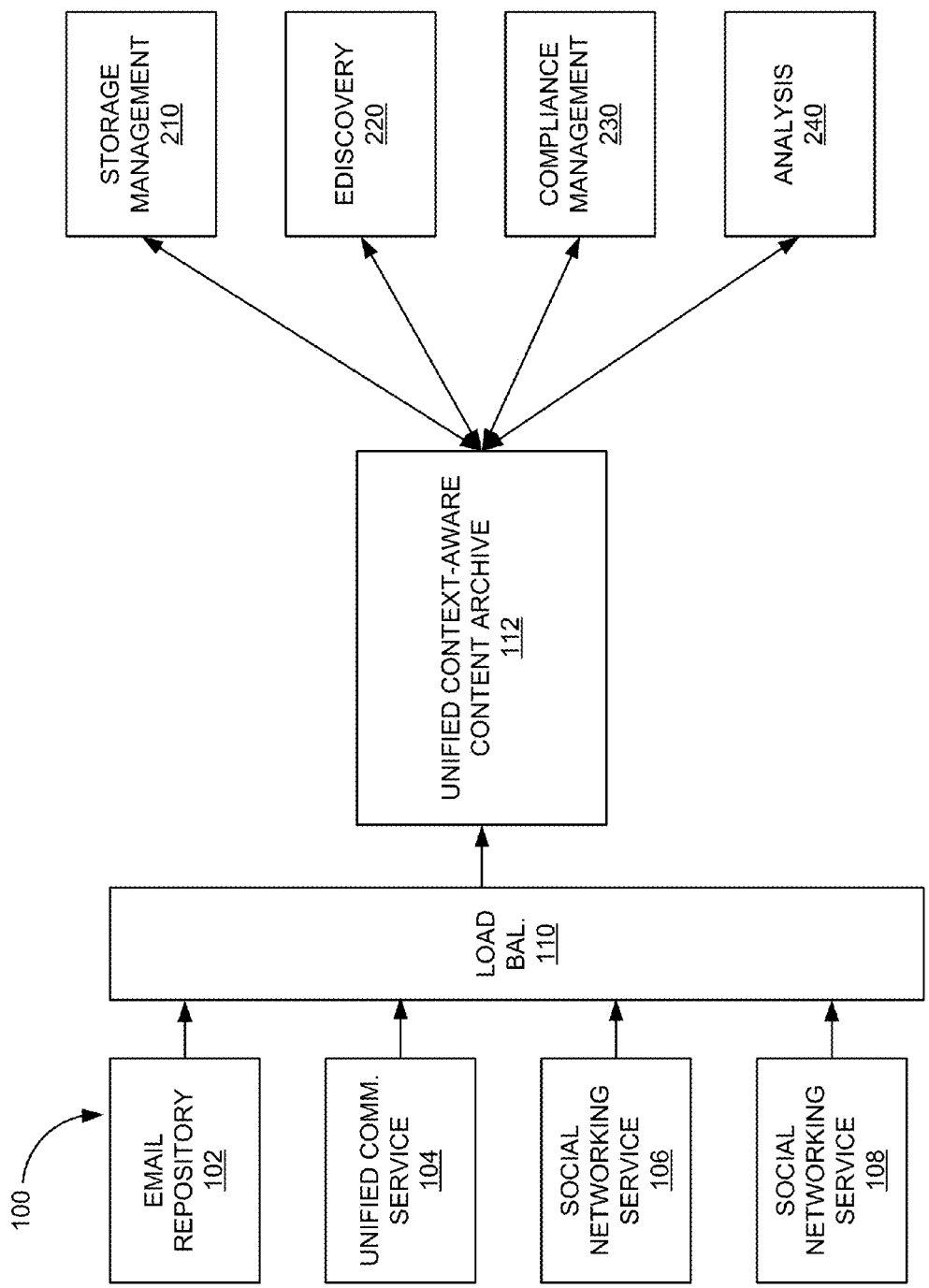
FIG. 2 is a block diagram illustrating different applications of the electronically stored information system of FIG. 1 according to various embodiment of the present invention.

FIG. 2 is a block diagram illustrating different applications of ESI system of FIG. 100 according to various embodiment of the present invention. In this example, unified context-aware content archive 112 may be deployed in the cloud. Communication modality infosets and business record events may be sent to unified context-aware content archive 112 using a variety of protocols, such as HTTP/S Transport and SMTP Transport for Email Journal. The communication modality infosets undergoe a normalization process by unified context-aware content archive 112 to unify the infoset into a coherent structure that represents an interaction transcript model ("ITM"). As discussed above, unified context-aware content archive 112 may include one or more engines that allow for data enrichment, data partitioning and segregation into underlying storage medium, and data indexing whereby content index is generated based on data domain context.

In various embodiments, unified context-aware content archive 112 may be managed by storage management module 210. Storage management module 210 represents hardware and/or software elements configured to manage aspects of the operation of unified context-aware content archive 112.

In some embodiments, unified context-aware content archive 112 may be integrated with eDiscovery module 220, compliance management module 230, and analysis module 240. eDiscovery module 220 represents hardware and/or software elements configured for managing eDisovery processes, such as an identification phase when potentially responsive documents are identified for further analysis and review, a preservation phase where data identified as potentially relevant is placed in a legal hold, a collection phase where once documents have been preserved, data can be transferred for processing (e.g., by legal counsel) to determine relevance and disposition, a processing phase where data is prepared to be loaded into a document review platform, a review phase where documents are reviewed for responsiveness to discovery requests and for privilege, and a production phase. In one aspect, eDiscovery module 220 may interface directly with the search capabilities and aggregated results provided by unified context-aware content archive 112.

Compliance management module 230 represents hardware and/or software elements configured for managing compliance requirements faced by an organization. In one aspect, compliance management module 230 may interface directly with the search capabilities and aggregated results provided by unified context-aware content archive 112. Analysis module 240 represents hardware and/or software elements configured for analyzing the stored information. A variety of analytics may be performed to determine information related to communications, modalities, participants, contexts, and the like.

Figure 3:
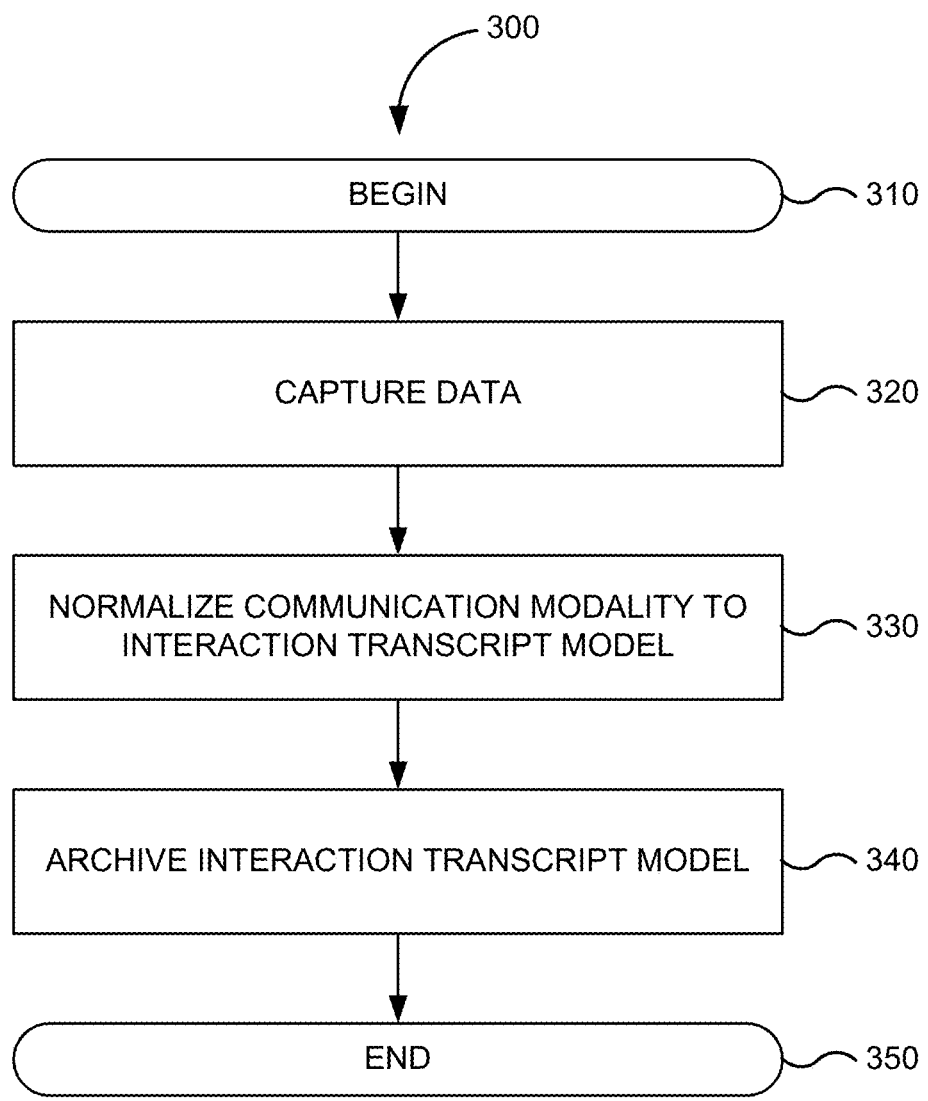
FIG. 3 is a simplified flowchart of a method for archiving content in a context-aware manner according to one embodiment of the present invention.

FIG. 3 is a simplified flowchart of method 300 for archiving content in a context-aware manner according to one embodiment of the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, data is captured. As discussed above, multiple communication modalities are captured. In step 330, each communication modality is normalized to an interaction transcript model. Communication mediums can be classified into the four distinct aforementioned categories according to shared common characteristics. Infosets for multiple communication modalities are the normalized into the single information structure. In some embodiments, infosets may undergo processes for data enrichment, deconstruction, and information partitioning. In step 340, the interaction transcript model is then archived. FIG. 3 ends in step 350.

Data Flow and Process

Figure 4:
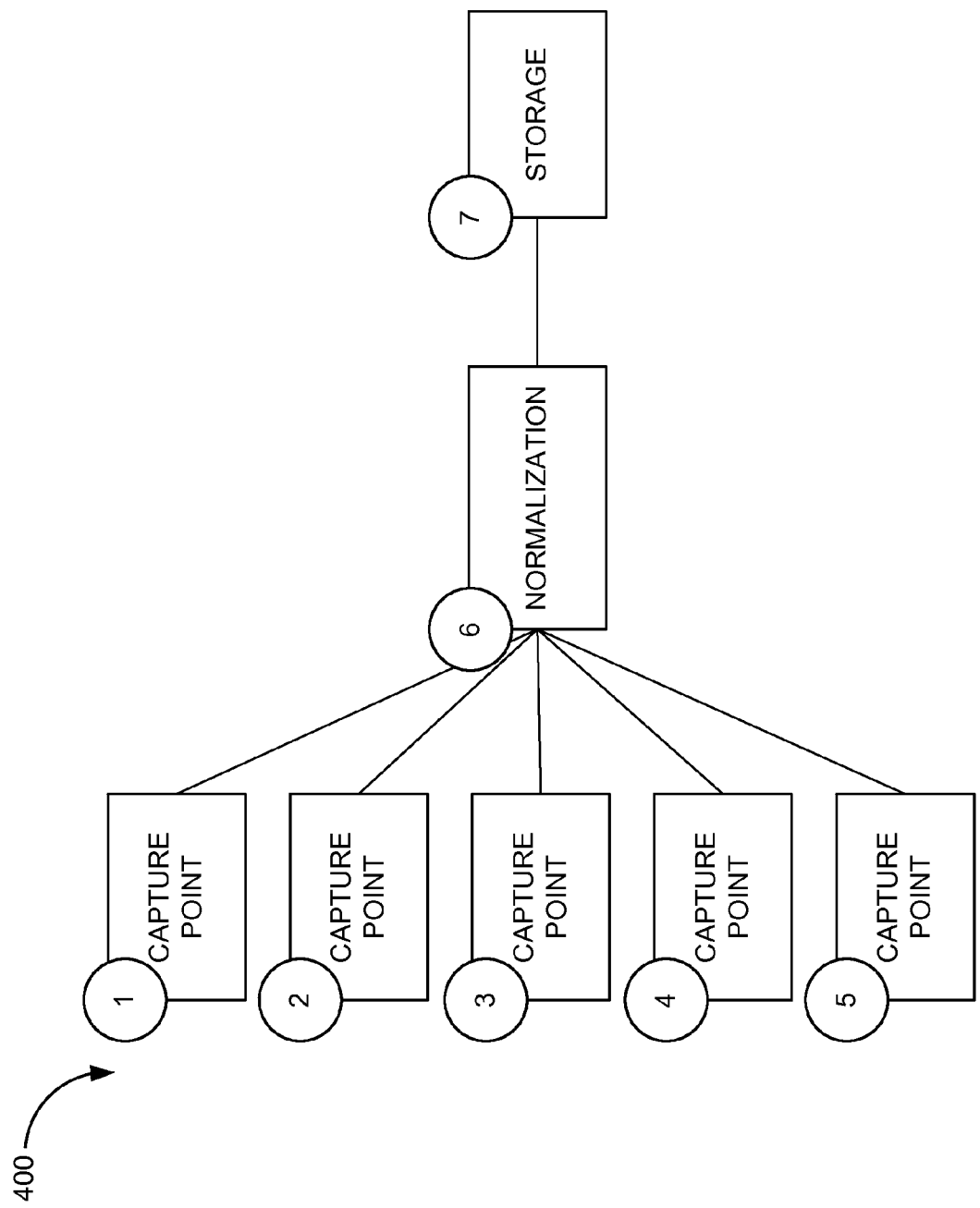
FIG. 4 is a block diagram illustrating an overview of a flow in terms of data and process in electronically stored information system of FIG. 1 according to one embodiment of the present invention.

FIG. 4 is a block diagram illustrating an overview of a flow in terms of data and process in ESI system 100 of FIG. 1 according to one embodiment of the present invention. In this example, circles with a numeric value indicate a step of interest in the overview of the flow. In steps 1-5, communication modalities are captured from numerous applications/devices at a variety of generalized or specific capture points. Some examples of applications and devices from which communication modalities may be captured include, Microsoft Exchange/Outlook, Gmail, Hotmail, Lotus Notes, etc., SharePoint, IBM Connections, Web Conferencing such as WebEx, Skype, Microsoft Communication Server, Voice Telephony, Cisco Phones, Cell Phones, Mobile Phones, iOS, Android running on Mobile Devices, Tables, Slates, Instance Messaging, Microsoft Messenger, Salesforce Chatter, Jive, Social Media, Facebook, LinkedIn, Twitter. Each capture point, in essence, tracks the "dialogs" between humans and devices. A capture point may enrich the information to further provide the interaction context for downstream discovery (search, data/process/behavior/semantic mining, analytics, reporting, etc.)

In various embodiments, capture points of communication modalities can be information retrieval systems that allow a user to retrieve information having different attributes from heterogeneous application sources. In one embodiment, a capture point is an agent that extends additional information for the purposes of deriving context. A searchable context then can be associated with the information based on enriched attributes of a subject represented by a user's interaction on a system with one or more humans by way of device communication. As discussed above, the context-oriented information model is normalized in step 6 and stored in step 7.

Figure 5:
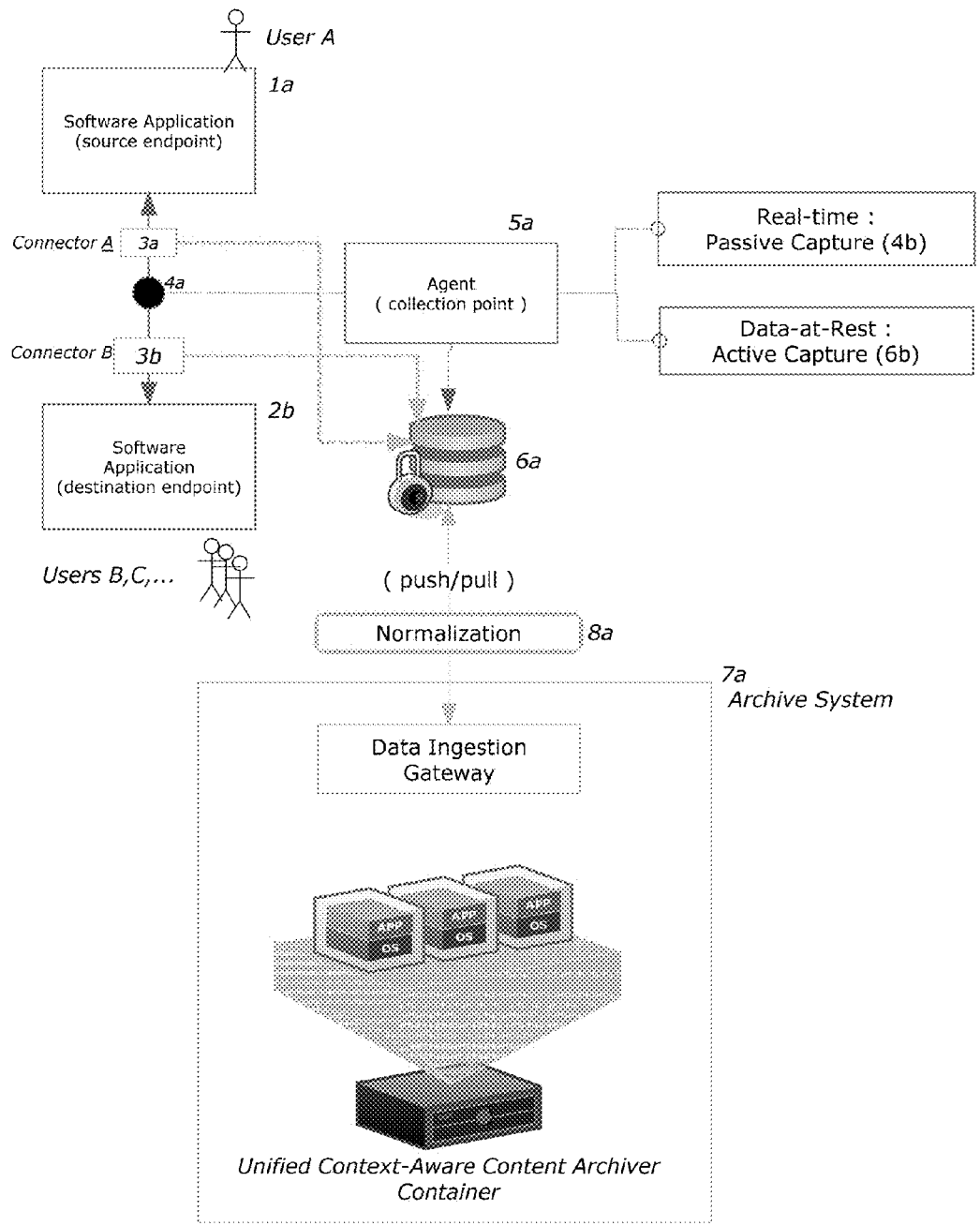
FIG. 5 is a diagram illustrating an overview of capture point data flow according to one embodiment of the present invention.

FIG. 5 is a diagram illustrating an overview of capture point data flow according to one embodiment of the present invention. FIG. 5 provides for two methods used to enrich information derived from various communication modalities.

Figure 6:
FIG. 6 illustrates user A sending a communication to users at corresponding destination endpoints in the capture point data flow of FIG. 5.

In a first, entitled real-time (Data-in-Transit) passive capture, ESI system 100 provides for passive capture that denotes the ability inspect packets (datagrams) over the wire without interference or requiring explicit data injection (enrichment) by the participating device communications being used by one or more users, the participants, on a network transport. Device communication means the broad-spectrum of the target applications, running services, physical (stationary computer) or communication/mobile device residing on a network transport (the wire) used as the pathway to communicate to another endpoint (communication device). For example, FIG. 6 illustrates user A sending a communication from a source application (1a) (text, instance message, electronic note, message, email, document, video, audio), termed media, to users at corresponding destination endpoints (2b). Destination endpoints may involve one or more target endpoints. There is a one-to-one correspondence between endpoint and a user (the participant).

In one aspect, ESI system 100 may utilize a wire tap to intercept the communication. For example, device (4b) is used to collection information in real-time by sniffing data over the wire and collects the data at agent (5a) at a capture/collection point. A data repository or connector is linked to agent (5a) to track user ids inspected by the wire tap. In one example, a session id is derived and tracked for user A's "interactions" with other users on the network. User credentials can be interrogated, validated, and depending on policies established by agent (5a) approved. In some aspects, a user ID is mapped to an employer id. In another aspect, a user ID is mapped to a buddy list (use of aliases or display names as account information supplied by user to connect to out-bound communication devices or software applications).

All electronic information (media: text, document, voice, audio, messaging, etc) are collected into repository (6*a*). Once a document is resident (at rest), an enrichment process may take place on the captured electronic information as a business record. Some examples of enrichment are the determination and processing of event ids, transaction ids, correlation ids, links to connected events (prior/previous), participant ids, communication ids (information about the communication id), timeframe of conversation, information of all users involved in the originating communication, information of all file events (related file uploads, attachments, etc), information of all text events (the primary context of the initiating communication; e.g., body of text, message, instant message, etc.), information derived from user session tracking, and the like.

Once data is enriched, an interaction context can be generated. The interaction context corresponds to an open-closed event which signifies the full scripts of text events, file events and corresponding participant events. This data is packaged and prepared for archiving.

In a second, entitled (Data-at-Rest) active capture, ESI system 100 provides explicit intervention by software agents to enrich data along the pathway of communication between end points (users & device communications). Usually, this is done via an API or SPI complying with a well defined protocol. In one aspect, ESI system 100 enriches data at the point of capture using the application sources (end points) used as a mean to facilitate and mediates the communication pathways between users. This is done typically be adding a connector to the source application which allows for direct insertion of metadata to the collection repository (6*a*) using a software development toolkit ("SDK"). Accordingly, one or more connector are installed at application sources (end points). An API or SPI is made available from a software development toolkit is used to enrich the data and business records are stored in a collection repository via a binding protocol to submit normalized data.

FIGS. 7A-7E are tables illustrating mappings between different communication modalities and a single information structure according to various embodiments of the present invention.

Referring again to FIG. 5, in step 6, a normalization process occurs for captured communication modalities. In this example, normalization is governed by an API protocol that allows source applications via connectors or installed agents. The process of normalization may take place at a source installation of agent (5*a*).

In this example, a business record is extracted from a agent's repository containing business records of interest. An infoset described by meta model (XML Schema) is pushed to a Data Ingestion Component. This normalized transcript under goes an ETL process for de-encapsulation of business records performed by the DPE staging pipeline. Information is then derived from the normalized transcript. An interaction context is generated whereby metadata about the events, start time, end-time, communication, event id is determined. Furthermore, derived information may include a collection of participant events, a collection of text events, a collection of file events, or the like.

With the application of social media domains (large scale networks; Facebook, LinkedIn, Twitter, Microsoft, Google, Applet, Bloomberg, etc.), the unified context-aware content store generates meaningful contexts of activities (interaction between participants, consumers, business entities, etc.) in real-time. In one aspect, meaningful contexts may be generated of (interaction between participants, consumers, business entities, etc.) at capture points—passive processing. In another aspect, search-ability of "normalized context" is improved by bridging all forms of communication into a single context (the conversation of interest for the business records).

In further embodiments, the unified context-aware content store provides an efficient application of storage. Data is not stored in traditional document form but rather virtualized into a coherent storage infrastructure that allows direct access and searchable content to data (document, binary, etc), structure storage, and unstructured storage.

Data Enrichment

In one aspect, a secondary stage is executed which under goes further enrichment by one or more data processing engine as discussed below. An augmented normalized model representation can be generated that provides additional metadata and statistics information for further context processing. Business records can then be mediated to underlying storage facilities such as an indexer, metadata storage, and a blob store. Business records may be indexed across disparate storage systems for searchable context.

Figure 8:
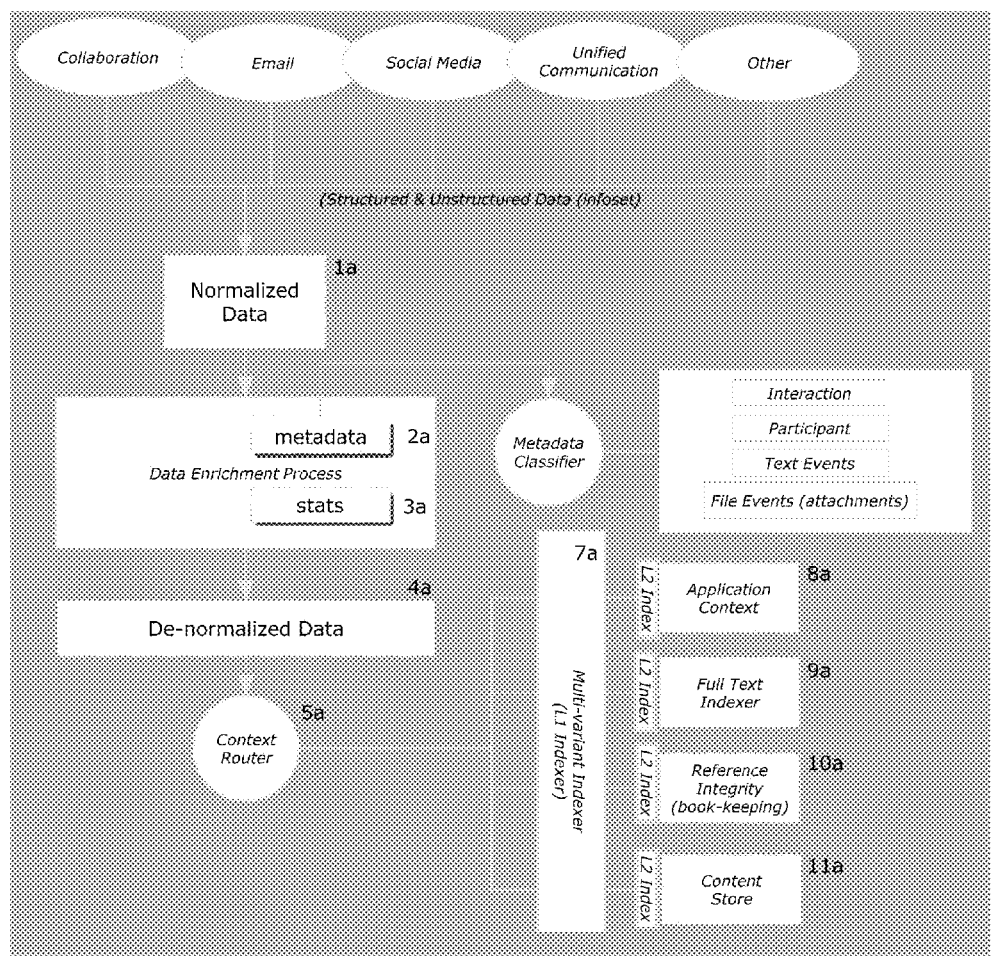
FIG. 8 illustrates enrichment according to one embodiment of the present invention.

FIG. 8 illustrates enrichment according to one embodiment of the present invention. In this example, normalized data undergoes a data enrichment process via a metadata augmenter. The metadata augmenter is used, for example, to correlate relationship of communication events specific to text, participant, and file events. Each of these events are contained within a interaction transcript model. In another example, the metadata augmenter is used to correlate the time series events by tying together the start-end timeframe supplied by the transcript, to correlate the participants associated with the context, to add additional interaction context for synthesis of snapshots stored and managed by the indexer, and the like.

In this example, classification is a final stage of the process. Data is extended based on context of events. Four distinct pieces of information are of interests, interaction events, text events, participant events, and file events.

Once data has been classified, it can be routed to a storage facility grouped based on the classes, such application storage that stores data/business records in a tenant namespace that guarantees data isolation, metadata storage that provides big data storage facilities for metadata, full text search stage that provides full scale search facility, blob storage that provides big data storage facilities for blobs.

In some embodiments, business records can again be normalized for applications, such as eDiscovery, compliance management, and analytics.

Figure 9:
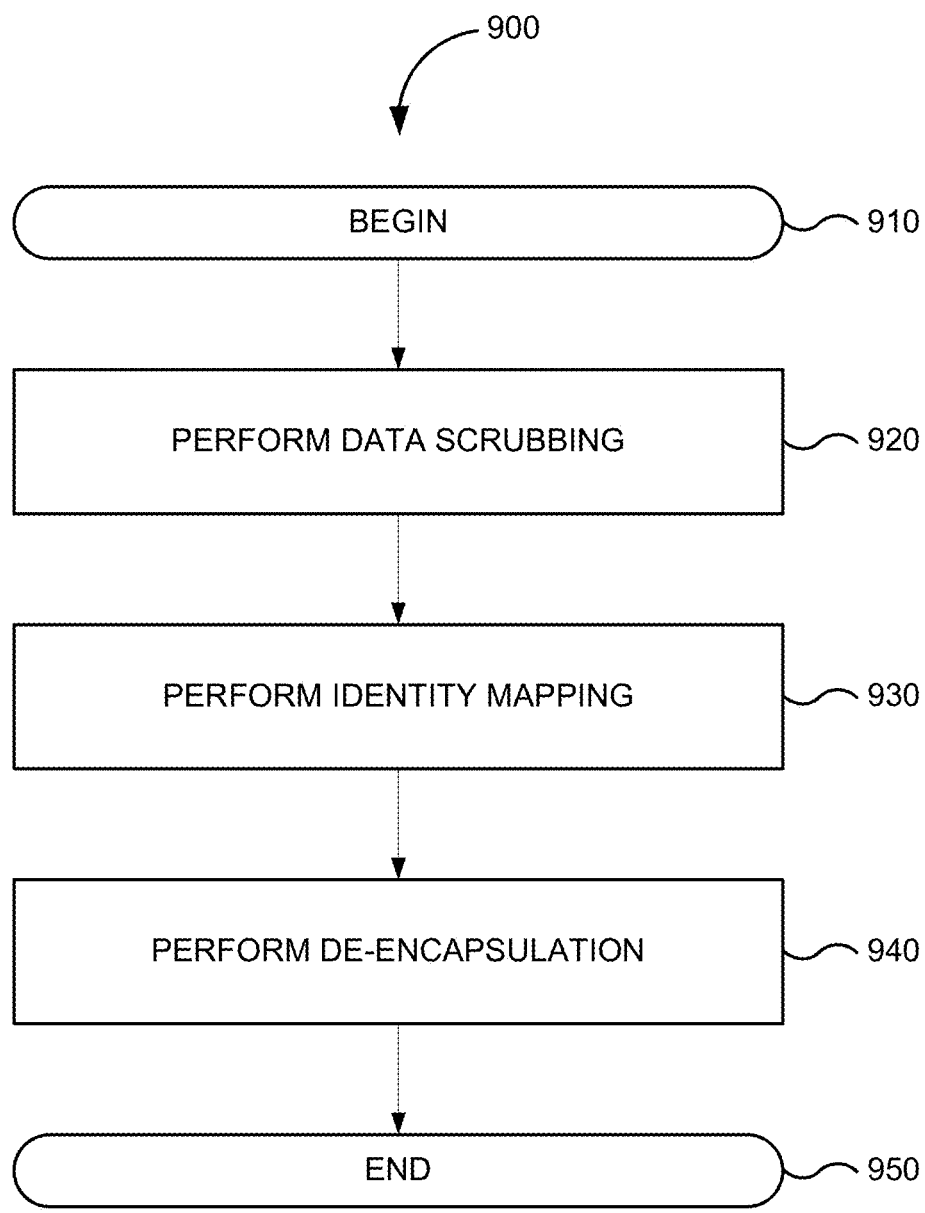
FIG. 9 is a simplified flowchart of a method for normalizing data in one embodiment according to the present invention.

FIG. 9 is a simplified flowchart of method 900 for normalizing data in one embodiment according to the present invention. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, data scrubbing is performed. In step 930, identity mapping is performed. In step 940, data de-encapsulation is performed. FIG. 9 ends in step 950.

Figure 10:
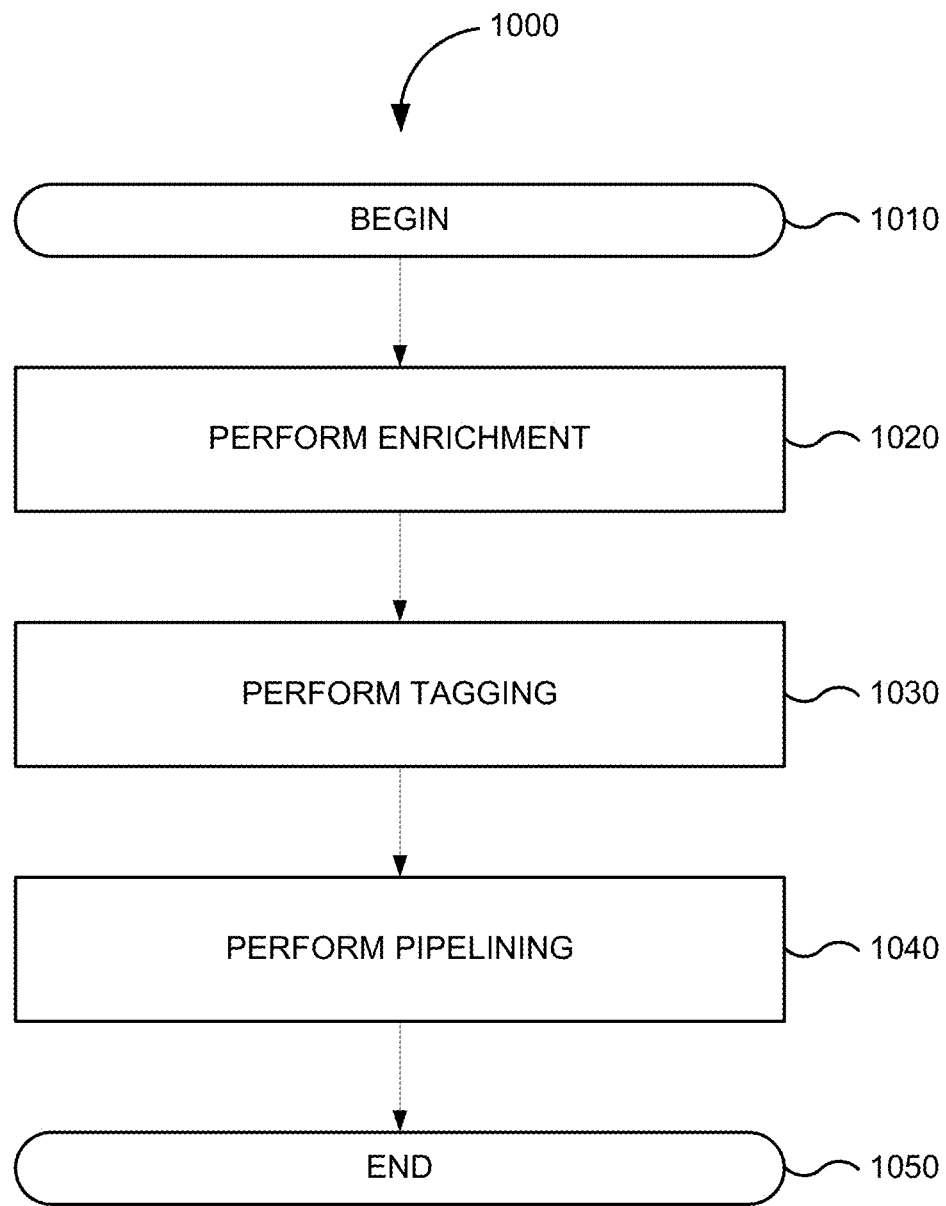
FIG. 10 is a simplified flowchart of a method for normalizing data in one embodiment according to the present invention.

FIG. 10 is a simplified flowchart of method 1000 for normalizing data in one embodiment according to the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, data enrichment is performed. In step 1030, data tagging is performed. In step 1040, data pipelining is performed. FIG. 10 ends in step 1050.

Figure 11:
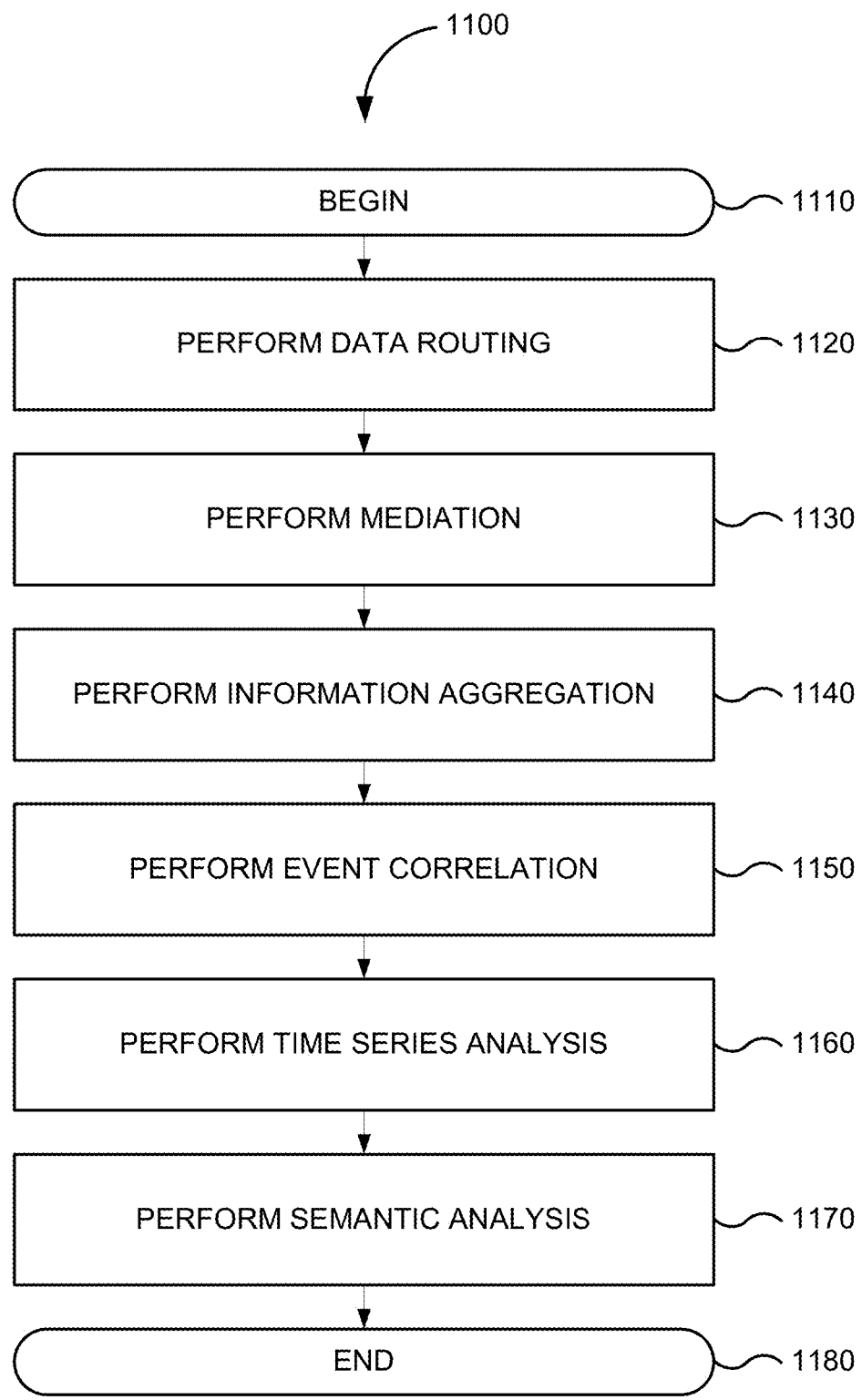
FIG. 11 is a simplified flowchart of a method for normalizing data in one embodiment according to the present invention.

FIG. 11 is a simplified flowchart of method 1100 for normalizing data in one embodiment according to the present invention. Implementations of or processing in method 1100 depicted in FIG. 11 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1100 depicted in FIG. 11 begins in step 1110.

In step 1120, data routing is performed. In step 1130, mediation is performed. In step 1140, information aggregation is performed. In step 1150, event correlation is performed. In step 1160, time series analysis is performed. In step 1170, semantic analysis is performed. FIG. 11 ends in step 1180.

Conclusion

In various embodiments, methods and systems for archiving a plurality of communication modalities are provided such that information associated with each of the plurality of communication modalities is captured. The information may include documents representing electronic communications and metadata associated therewith. The information can be stored in a plurality of interaction transcript models that normalize interactions between participants that have been derived or determined from the documents into a common information structure. In one aspect, contexts associated with the interactions can be determined and searched enhancing the archival of the different communication modalities.

Figure 12:
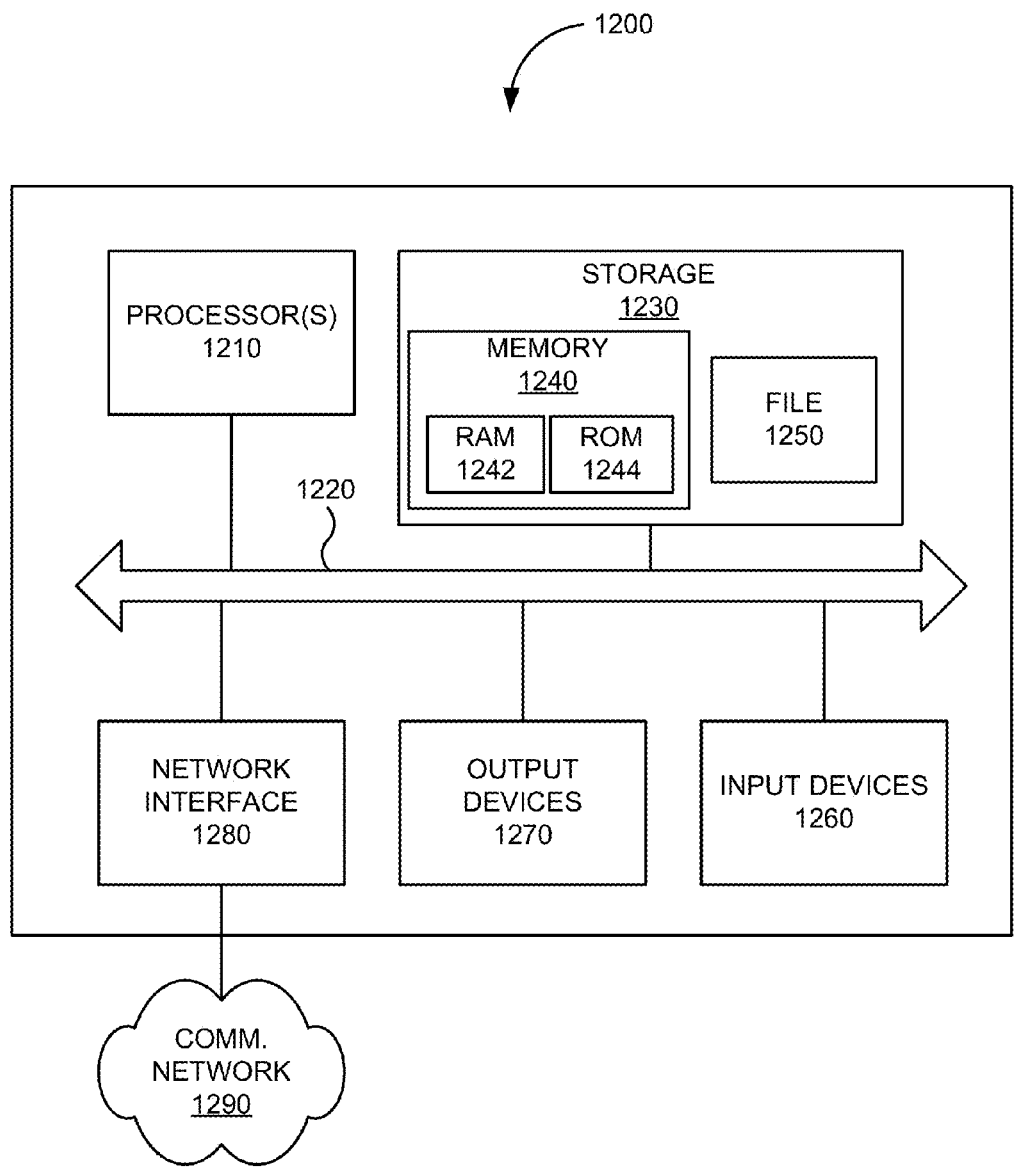
FIG. 12 is a block diagram of a computer system that may be used for archiving electronically stored information according to one embodiment of the present invention.

FIG. 12 is a block diagram of a computer system 1200 in an exemplary implementation of the invention. In this example, the computer system 1200 includes a monitor 1210, computer 1220, a keyboard 1230, a user input device 1240, one or more computer interfaces 1250, and the like. In the present embodiment, the user input device 1240 is typically embodied as a computer mouse, a trackball, a track pad, a joystick, wireless remote, drawing tablet, voice command system, eye tracking system, and the like. The user input device 1240 typically allows a user to select objects, icons, text and the like that appear on the monitor 1210 via a command such as a click of a button or the like.

Embodiments of the computer interfaces 1250 typically include an Ethernet card, a modem (telephone, satellite, cable, ISDN), (asynchronous) digital subscriber line (DSL) unit, FireWire interface, USB interface, and the like. For example, the computer interfaces 1250 may be coupled to a computer network 1255, to a FireWire bus, or the like. In other embodiments, the computer interfaces 1250 may be physically integrated on the motherboard of the computer 1220, may be a software program, such as soft DSL, or the like.

In various embodiments, the computer 1220 typically includes familiar computer components such as a processor 1260, and memory storage devices, such as a random access memory (RAM) 1270, disk drives 1280, and system bus 1290 interconnecting the above components.

The RAM 1270 and disk drive 1280 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, the computer system 1200 may also include software that enables communications over a network such as the HTTP, TCP/IP, RTP/RTSP protocols, and the like. In alternative embodiments of the present invention, other communications software and transfer protocols may also be used, for example IPX, UDP or the like.

It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for archiving communications, the method comprising:
   receiving, at one or more computer systems, information associated with one or more documents captured for at least one of a plurality of communication modalities;
   determining, with one or more processors associated with the one or more computer systems, a mapping between data attributes of at least one document from the one or more documents and data attributes of an information structure;
   storing, with the one or more processors associated with the one or more computer systems, contents of the at least one document in the information structure and the data attributes of the at least one document according to the mapping;
   determining, with the one or more processors associated with the one or more computer systems, information indicative of an interaction between one or more participants of at least one or more communications represented by the one or more documents;
   generating, with the one or more processors associated with the one or more computer systems, a transcript of the interaction that includes a sequence of the one or more documents representing the one or more communications during the interaction; and
   storing, with the one or more processors associated with the one or more computer systems, a mapping representing association of the at least one document from the one or more documents with the transcript of the interaction in the information structure according to a model that normalizes information associated with the plurality of communication modalities into the information structure that includes scrubbing data, determining identity information and de-encapsulating the data.

2. The method of claim 1 wherein the plurality of communication modalities comprises email communications, unified communications, collaboration communications, and social network communications.

3. The method of claim 1 wherein determining, with the one or more processors associated with the one or more computer systems, the information indicative of the interaction between the one or more participants of the at least one or more communications represented by the one or more documents comprises determining a combination of event-base timing signatures, participants engaging in an interaction, a unique correlation of persons, correlation through time, correlation through participant associations, and relationships through identity management.

4. The method of claim 1 wherein storing, with the one or more processors associated with the one or more computer systems, the transcript of the interaction according to the model that normalizes information associated with the plurality of communication modalities into the information structure further comprises inferring information about at least one document for attributes of the information structure from another source.

5. The method of claim 1 wherein storing, with the one or more processors associated with the one or more computer systems, the transcript of the interaction according to the model that normalizes information associated with the plurality of communication modalities into the information structure further comprises deriving information about at least one document for attributes of the information structure from another source.

6. The method of claim 1 wherein storing, with the one or more processors associated with the one or more computer systems, the transcript of the interaction according to the model that normalizes information associated with the plurality of communication modalities into the information structure further comprises partitioning data across a specialized medium store.

7. The method of claim 1 wherein storing, with the one or more processors associated with the one or more computer systems, the transcript of the interaction according to the model that normalizes information associated with the plurality of communication modalities into the information structure further comprises tagging the interaction based on a set of predetermined tags.

8. The method of claim 1 wherein generating, with the one or more processors associated with the one or more computer systems, the transcript of the interaction comprises determining one or more contexts across each of the plurality of communication modalities.

9. The method of claim 1 wherein generating, with the one or more processors associated with the one or more computer systems, the transcript of the interaction comprises determining relationships between the one or more participants.

10. The method of claim 1 wherein generating, with the one or more processors associated with the one or more computer systems, the transcript of the interaction comprises deriving or inferring a context via sequenced ordering of events corresponding to each distinct event.

11. A system for archiving a plurality of communication modalities, the system comprising:
   a processor; and
   a memory configured to store a set of instructions which when executed by the processor causes the processor to:
   capture information associated with each of the plurality of communication modalities;
   store the information associated with each of the plurality of communication modalities in a plurality of interaction transcript models that normalize each of the plurality of communication modalities into a information structure by mapping the attributes of the plurality of communication modalities into attributes of the information structure and scrubbing data, determining identity information and de-encapsulating the data;
   generate one or more contexts across the plurality of communication modalities based on the plurality of interaction transcript models and an interaction between one or more participants of at least one or more communications; and store information associating the one or more contexts with the plurality of interaction transcript models.

12. The system of claim 11 wherein the plurality of communication modalities comprises email communications, unified communications, collaboration communications, and social network communications.

13. The system of claim 11 wherein the processor is further configured to detect a communication medium in at least one of the plurality of communication modalities based on the captured information and a set of common characteristics.

14. The system of claim 13 wherein the communication medium is detected based on a combination of event-base timing signatures, participants engaging in an interaction, a unique correlation of persons, correlation through time, correlation through participant associations, and relationships through identity management.

15. The system of claim 11 wherein to store the information associated with each of the plurality of communication modalities in the plurality of interaction transcript models that normalize each of the plurality of communication modalities into the information structure the processor is further configured to infer information for attributes of the information structure from another source.

16. The system of claim 11 wherein to store the information associated with each of the plurality of communication modalities in the plurality of interaction transcript models that normalize each of the plurality of communication modalities into the information structure the processor is further configured to derive information for attributes of the information structure from another source.

17. The system of claim 11 wherein to store the information associated with each of the plurality of communication modalities in the plurality of interaction transcript models that normalize each of the plurality of communication modalities into the common structure the processor is further configured to partition data across specialized medium store.

18. The system of claim 11 wherein to store the information associated with each of the plurality of communication modalities in the plurality of interaction transcript models that normalize each of the plurality of communication modalities into the information structure the processor is further configured to tag information based on a set of predetermined tags.

19. The system of claim 11 wherein to generate one or more contexts across the plurality of communication modalities based on the plurality of interaction transcript models the processor is further configured to determine one or more conversations between participants.

20. The system of claim 11 wherein to generate one or more contexts across the plurality of communication modalities based on the plurality of interaction transcript models the processor is further configured to determine relationships between participants.

21. The system of claim 11 wherein to generate one or more contexts across the plurality of communication modalities based on the plurality of interaction transcript models the processor is further configured to derive or infer a context via sequenced ordering of events corresponding to each distinct event.

22. The system of claim 11 wherein to generate one or more contexts across the plurality of communication modalities based on the plurality of interaction transcript models the processor is further configured to derive or infer a context via chronologic events corresponding to each distinct event.

23. The system of claim 11 wherein to generate one or more contexts across the plurality of communication modalities based on the plurality of interaction transcript models the processor is further configured to derive or infer a context via linked to participants in question.

24. The system of claim 11 wherein the processor is further configured to generate a full text search of the one or more contexts.

25. The system of claim 11 wherein the processor is further configured to perform a semantic analysis of the one or more contexts.

26. The system of claim 11 wherein the processor is further configured to model and visualize interaction context results.

27. The system of claim 26 wherein the processor is further configured to generate a time-line view of the interaction context results.

28. The system of claim 26 wherein the processor is further configured to generate a threaded contexts view of the interaction context results.

29. The system of claim 26 wherein the processor is further configured to generate a social graph of the interaction context results.

* * * * *